United States Patent
Schieke et al.

(10) Patent No.: US 11,130,183 B2
(45) Date of Patent: Sep. 28, 2021

(54) TOOL, MACHINE AND METHOD FOR PRODUCING ROOF RIDGE-SHAPED CHAMFERS ON TEETH OF AN INTERNALLY AND EXTERNALLY TOOTHED GEARWHEEL

(71) Applicant: Präwema Antriebstechnik GmbH, Eschwege/Werra (DE)

(72) Inventors: Jörg Schieke, Erfurt-Marbach (DE); Walter Holderbein, Eschwege (DE)

(73) Assignee: Präwema Antriebstechnik GmbH, Eschwege/Werra (DE)

( * ) Notice: Subject to any disclaimer, the term of this patent is extended or adjusted under 35 U.S.C. 154(b) by 0 days.

(21) Appl. No.: 16/491,378

(22) PCT Filed: Mar. 8, 2018

(86) PCT No.: PCT/EP2018/055811
§ 371 (c)(1),
(2) Date: Sep. 5, 2019

(87) PCT Pub. No.: WO2018/162663
PCT Pub. Date: Sep. 13, 2018

(65) Prior Publication Data
US 2020/0023445 A1 Jan. 23, 2020

(30) Foreign Application Priority Data
Mar. 9, 2017 (DE) ................... 10 2017 105 032.9

(51) Int. Cl.
*B23F 21/12* (2006.01)
*B23C 5/10* (2006.01)
(Continued)

(52) U.S. Cl.
CPC .............. *B23C 5/10* (2013.01); *B23F 19/107* (2013.01); *B23F 21/005* (2013.01); *B23C 2210/285* (2013.01)

(58) Field of Classification Search
CPC ........ B23F 21/00; B23F 21/005; B23F 19/10; B23F 19/107; B23F 2210/285
See application file for complete search history.

(56) References Cited

U.S. PATENT DOCUMENTS 5,899,645 A    5/1999  Garschagen et al.
7,431,544 B2 * 10/2008 Ribbeck ................... B23C 5/22
                                                         407/29

(Continued)

FOREIGN PATENT DOCUMENTS

DE        19518483 A1    11/1996
DE    102005042735 A1    10/2006
(Continued)

OTHER PUBLICATIONS

English translation of DE 202007006751 U1 (Year: 2007).*

*Primary Examiner* — Alan Snyder
(74) *Attorney, Agent, or Firm* — The Webb Law Firm (57) ABSTRACT

The invention provides a tool, a method and a machine with which roof ridge-shaped chamfers can be produced on teeth of an internally and externally toothed gearwheel with minimised changeover times during tool set up. For this purpose, a tool according to the invention comprises a tool carrier having a holding section for attachment in a tool holder and a chamfering tool, which is held on the end section of the tool carrier, said end section being associated with the other end face, and during use describes an impact circle with its cutting edge, the diameter of said circle being determined by the radial distance of the cutting edge of the chamfering tool from the axis of rotation of the tool. According to the invention, at least one further chamfering (Continued)

tool is attached in a middle section of the tool carrier which is offset relative to the end section provided with the chamfering tool towards the holding section of the tool carrier. At the same time, the further chamfering tool is held with its cutting edge at a radial distance from the axis of rotation of the tool, which is greater than the radial distance of the cutting edge of the chamfering tool held on the end section of the tool holder. A method according to the invention and a machine according to the invention are based on the use of tools according to the invention.

14 Claims, 5 Drawing Sheets

(51) Int. Cl.
  *B23F 19/10* (2006.01)
  *B23F 21/00* (2006.01)

(56) References Cited

U.S. PATENT DOCUMENTS

| | | |
|---|---|---|
| 2018/0079019 A1 | 3/2018 | Heyn |
| 2018/0111209 A1 | 4/2018 | Prock |

FOREIGN PATENT DOCUMENTS

| | | |
|---|---|---|
| DE | 202007006751 U1 | 7/2007 |
| DE | 102011050499 A1 | 11/2012 |
| DE | 202013009805 U1 | 1/2014 |
| DE | 102015104242 A1 | 9/2016 |
| DE | 102015120556 A1 | 9/2016 |

* cited by examiner

TOOL, MACHINE AND METHOD FOR PRODUCING ROOF RIDGE-SHAPED CHAMFERS ON TEETH OF AN INTERNALLY AND EXTERNALLY TOOTHED GEARWHEEL

CROSS-REFERENCE TO RELATED APPLICATIONS

This application is the United States national phase of International Application No. PCT/EP2018/055811 filed Mar. 8, 2018, and claims priority to German Patent Application No. 10 2017 105 032.9 filed Mar. 9, 2017, the disclosures of which are hereby incorporated by reference in their entirety.

BACKGROUND OF THE INVENTION

Field of the Invention

The invention relates to a tool for producing roof ridge-shaped chamfers on teeth of an internally and externally toothed gearwheel. Such tools usually have a finger-like tool carrier with a holding section, which is associated with an end face of the tool carrier and provided for attachment in a tool holder of a machine tool. In addition, such tools also comprise at least one chamfering tool which is held on the end section of the tool carrier associated with the other end face and during use describes an impact circle with its cutting edge, the diameter of the impact circle being determined by the radial distance of the cutting edge of the chamfering tool from the axis of rotation of the tool.

The invention also relates to a machine tool and to a method for producing roof ridge-shaped chamfers on the teeth of an internally and externally toothed gearwheel, in which tools of the type in question here are used.

DESCRIPTION OF RELATED ART

Tools of this type and machines equipped with such tools, as well as methods carried out using such tools are known in various designs. They serve to produce bevels, sharply tapering towards each other in the direction of the respective end face, at the end faces of internally and externally toothed gearwheels serving as, for example, synchronising rings or sliding sleeves in automotive transmissions, in technical language known as "roof ridge-shaped chamfers" or "bevelling". This sharply tapering form, facilitates the insertion of the teeth into the toothing of the gearwheel with which the correspondingly sharpened toothing is to be brought into engagement, during the switching process.

For example, DE 195 18 483 C2 discloses a machine tool for producing such roof ridge-shaped chamfers (meshing engagement aid) on the end faces of the teeth of gearwheels in a synchronous process with two finger-like tools, therein referred to as a "fly cutter milling tool". The tools are independently pivotable in three coordinate axes and about at least one more own axe. In order on the one hand to achieve a high milling performance and on the other hand to ensure that an unavoidable burr is created only on that part of the roof-ridge of each chamfering where the removal of the burr is achieved by opposing overlapping, it is provided that each tool is fitted with at least two chamfering tools symmetrically arranged about their axis of rotation, known as a "fly cutter", respectively seated on the end section of the tool associated with the workpiece to be machined. In this case, the chamfering tools can be adjusted in different axes and about different pivot axes relative to the workpiece spindle due to their individual adjustability, so that the individual fly cutter of each fly cutter milling tool successively cuts different teeth and mills the teeth only from within the tooth gap.

In the machine known from DE 10 2011 050 499 A1 for machining gearwheels, a first cutting edge tool is provided in the middle section of a tool carrier rotationally driven by a spindle drive, said cutting edge tool serving to produce backing or latching grooves in the lateral tooth flanks of the teeth of the gearwheel to be machined. In addition, a second cutting edge tool is provided, offset in the axial direction of the tool spindle towards the front end of the tool carrier relative to the first cutting edge tool. This second cutting edge tool is a bevelling tool, which sits on the free end face of the first tool carrier. The controller and the adjusting devices of the known machine are configured so that the tool equipped in this way can be positioned on the workpiece on the one hand for producing bevels on the front flanks of the teeth of the gearwheel and on the other hand for producing the backing or latching grooves.

The chamfering of internal and external toothing of a gearwheel in a work-holding fixture differs from the above-described known approaches in that with the known machines either an internal toothing or an external toothing is respectively to be machined. The known machines are equipped with two counter-rotating tools, whose axes of rotation are aligned at an angle to each other so that one tool respectively produces one and the other tool respectively produces the other surface of the pointed roof ridge-shaped chamfering on the end face of the teeth of the toothing. For machining the internal toothing, the tools are usually associated with two mutually adjacent quarter circles ("quadrants") of the toothing to be machined. If the external toothing is to be sharpened with the same tools and while maintaining the same directions of rotation relative to the workpiece, the tools must then be moved respectively to the two opposite quadrants. This need for adjustment requires a relatively large travel path, which, despite the time savings achieved by the omission of a retrofit, requires a great deal of time for the changeover between the machining of the internal and external toothing. This time requirement is particularly noticeable in the machining of large gearwheels, as for example when it is required for transmissions of heavy vehicles, such as trucks and the like.

Against this background, the object has arisen of providing a tool which allows minimised changeover times when chamfering internal and external toothing on gearwheels with the same tool.

Likewise, there was a requirement for the development of a machine and a method, with which the chamfering of the end faces of the teeth of both internally and externally toothed gearwheels is possible in a minimum machining time.

SUMMARY OF THE INVENTION

A tool according to the invention for producing roof ridge-shaped chamfers on teeth of an internally and externally toothed gearwheel comprises, in accordance with the above-described prior art, a finger-like tool carrier with a holding section, which is associated with one end face of the tool carrier and is provided for attachment in a tool holder of a machine tool, and a chamfering tool, which is held on the end section of the tool carrier associated with the other end face and during use describes an impact circle with its cutting edge, the diameter of the impact circle being determined by the radial distance of the cutting edge of the chamfering tool from the axis of rotation of the tool.

According to the invention, at least one further chamfering tool is fixed in a middle section of the tool carrier, which is arranged offset in the direction of the holding section of the tool carrier relative to the end section provided with the cutting tool seat, wherein the further chamfering tool is held with its cutting edge at a radial distance from the axis of rotation of the tool, said distance being greater than the radial distance of the cutting edge of the chamfering tool held on the end section of the tool holder.

Similarly, a machine for producing roof ridge-shaped chamfers on the teeth of an internally and externally toothed gearwheel comprises a drive, which during use drives the gearwheel to be machined rotationally about its axis of rotation, two tools designed according to the invention, at least one drive, which during use drives the tools rotationally about their respective axis of rotation, and control devices, which are provided for adjusting the tools between a first working position, in which they have their chamfering tools seated on their end sections and engage with the end faces of one of the teeth of the gearwheel, and a second working position, in which they have their chamfering tools seated on their middle sections and engage with the end surfaces of the other teeth of the gearwheel.

The method according to the invention for producing roof ridge-shaped chamfers on the end faces of the teeth of an internal and an external toothing of an internally and externally toothed gearwheel comprises the following steps in a corresponding manner:

clamping two inventively designed tools respectively into a tool holder;

adjusting the tools respectively into a first working position, in which they have their chamfering tools seated on their end sections and engage with the end faces of one of the teeth of the gearwheel, and adjusting the tools remaining in their tool holder into a second working position, in which they have their chamfering tools seated on their middle sections and engage with the end faces of the other teeth of the gearwheel, A tool according to the invention thus has at least two chamfering tools. On the one hand, these chamfering tools are offset relative to each other in a longitudinal direction of the tool carrier aligned axially parallel to the axis of rotation of the tool, on the one hand held on a frontal end and on the other hand on a middle section of the tool carrier. At the same time, the chamfering tools are positioned so differently spaced relative to the axis of rotation that their cutting edges carrying out the material removal at the tooth end faces to be sharpened rotate on impact circles of different sizes. The diameter of the impact circle of the chamfering tool positioned on the frontal end section of the tool carrier, in front of the workpiece to be machined, is smaller than the diameter of the impact circle of the cutting edge of the chamfering tool seated on the middle section of the tool.

Due to the inventive shaping of the tool and the particular inventive arrangement of the chamfering tools, the tool for machining the internal and external toothing must be moved only over the minimal adjustment path, which is respectively required in order to bring the chamfering tools seated on the end section and on the middle section of the tool carrier into the working position provided for them on the gearwheel to be machined. This adjustment path corresponds essentially to the distance between the chamfering tools arranged on the end section and the middle section, so that a change between the machining of the internal and external toothing can be made within a very short time.

The installation space required for the adjustment of the tools is also minimal. This makes it possible, with the aid of tools according to the invention, to carry out the machining of external and internal toothings in a work-holding fixture of a workpiece and in tools on conventional machines already available in the respective operations, in which the installation space which would be required for an adjustment of conventional tools between the working position respectively required for machining of the internal toothing and the external toothing is too small, It is essential for this procedural advantage of the invention that the tools according to the invention for the machining of the internal and external toothing remain in their fixture in the associated tool holder of the respective machine once positioned there. In a procedure according to the invention, neither is a change of the tools themselves required, nor is a change of their fixture in the machine required, because of the special shaping of the tools according to the invention and the arrangement of the chamfering tools when changing from the machining of the external toothing to the machining of the internal toothing. Instead, the required change in position and alignment of the tools between the working positions can be handled solely with the positioning capabilities available on conventional chamfering machines.

In the case of a machine according to the invention, the at least two tools provided there and their axes of rotation with respect to the gearwheel to be machined can be positioned and aligned such that the tools in their first working position, having their chamfering tools seated on their end sections, engage with the faces of the teeth of the internal toothing and in their second working position, having their chamfering tools seated on their middle sections, engage with the end faces of the teeth of the external toothing.

Conversely, however, it is also possible to position and align the tools and their axes of rotation with respect to the gearwheel to be machined so that the tools in their first working position, having their chamfering tools seated on their end sections, engage with the end faces of the teeth of the external toothing of the gearwheel and in their second working position, having their chamfering tools seated on their middle sections, engage with the end faces of the teeth of the internal toothing.

The fact that, in a tool according to the invention, the chamfering tool provided on the frontal end moves during use on a smaller impact circle around the axis of rotation of the tool than the chamfering tool provided in the region of the middle section, results in a shaping by which an adjustment of the respective tool between its working positions over a short distance can be safely achieved without the risk of collision with the gearwheel to be machined.

Accordingly, the tools can be easily moved in a machine according to the invention so that in their second working position they are associated with the same quadrant of the internal and external toothing of the gearwheel to be machined as in their first working position.

Residual burrs can also be avoided in the gearwheels sharpened on their end faces according to the invention, in that the tools are rotated during the chamfering machining in respectively opposite directions, so that they are moved out of one of the tooth gaps which delimit the respectively machined tooth towards the respective ridge of the chamfering to be produced, i.e. first forming the roof-ridge of the roof ridge-shaped chamfering to be machined by them, and then emerging from the material of the respectively machined tooth on the roof ridge of the chamfering.

In order to achieve this in the machining of the end faces of the teeth of both the internal and the external toothing, the direction of rotation of the tools in the machining of the end faces of the teeth of the internal and external toothing is expediently respectively selected, so that it takes an opposite direction of rotation in the machining of the internal toothing as in the machining of the external toothing.

In a tool according to the invention, the chamfering tools respectively provided for the machining of the internal and external toothing are expediently arranged with respect to the axis of rotation of the tool so that the cutting edge of the chamfering tool respectively provided for the machining of the internal toothing, viewed in the circumferential direction, is aligned opposite to the cutting edge of the chamfering tool respectively provided for the machining of the external toothing.

In principle, the middle section of the tool carrier carrying the further chamfering tool can be produced in any suitable manner which ensures sufficient support of the chamfering tool on the tool carrier in the distance provided according to the invention to the axis of rotation of the tool. In particular, in the case that the tool carrier is made of a solid material, it is advisable for this purpose to form the middle section as a ledge on which a seat for the further chamfering tool is present.

A particularly advantageous embodiment of the invention, in particular with regard to the avoidance of a collision with the gearwheel during the adjustment between the working positions, taking into account the alignment of the axes of rotation of the tool common in known machine tools, is characterised in that the radial distance of the cutting edge of the chamfering tool, respectively attached on the middle section of the tool carrier, from the axis of rotation is at least 1.5 times greater, in particular 2 times greater than the radial distance of the cutting edge of the chamfering tool, respectively attached on the end section of the tool carrier, from the axis of rotation.

It is also favourable with regard to the freedom of adjustability of a tool according to the invention if the distance, measured axially parallel to the axis of rotation, between the cutting edge of the chamfering tool held on the end section and the cutting edge of the chamfering tool held on the middle section is at least 30% of the distance, measured axially parallel to the axis of rotation, between the end of the holding section associated with the middle section and the end face of the tool carrier associated with the end section.

In this case, the "distance of the cutting edges" is considered to be the respective distance between the centres of the cutting edges, which are respectively measured.

The respective chamfering machining can be carried out with a tool according to the invention in a particularly time-efficient manner if at least two chamfering tools are respectively fixed to the end section and/or to the middle section of the tool carrier. A particularly simple possibility for synchronising the rotational movements of the tools respectively used and of the gearwheel to be machined is achieved when the chamfering tools associated with middle section and/or the end section are arranged opposite to each other in the radial direction with respect to the axis of rotation of the tool.

Cutting plates already known from the prior art and proven for this purpose are particularly suitable to be used as chamfering tools for the tool according to the invention; said cutting plates consist of suitable carbide materials and can be easily replaced when worn.

BRIEF DESCRIPTION OF THE DRAWINGS

The invention will subsequently be explained in more detail with reference to a drawing depicting exemplary embodiments. Shown schematically in the figures.

DESCRIPTION OF THE INVENTION

Figure 1A:
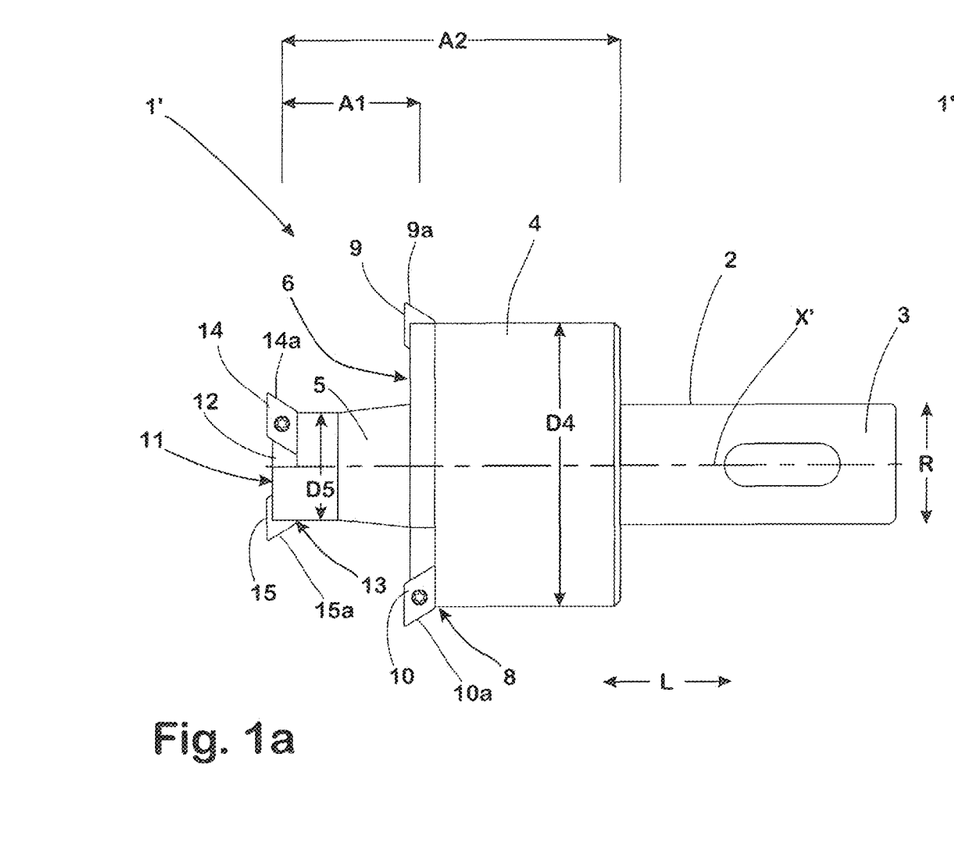
FIG. 1a a first tool for chamfering the end faces of teeth of an internally and externally toothed gearwheel.
Figure 1B:
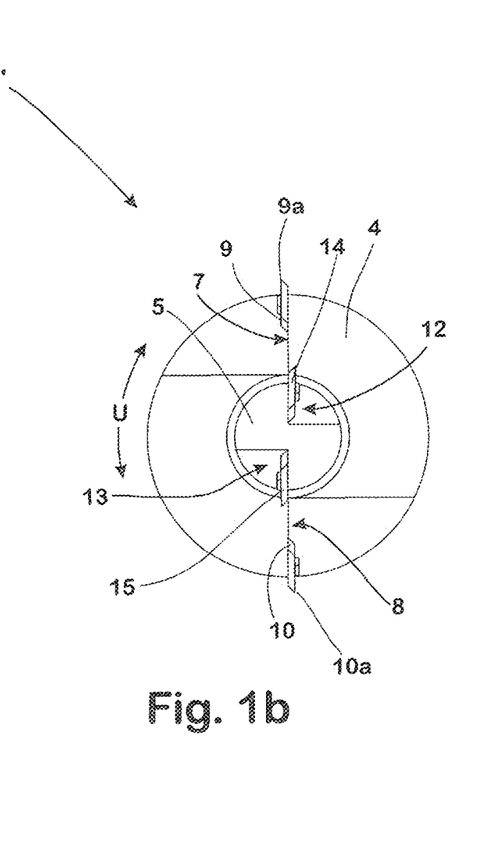
FIG. 1b the tool according to FIG. 1a in a frontal view on its end face.
Figure 1C:
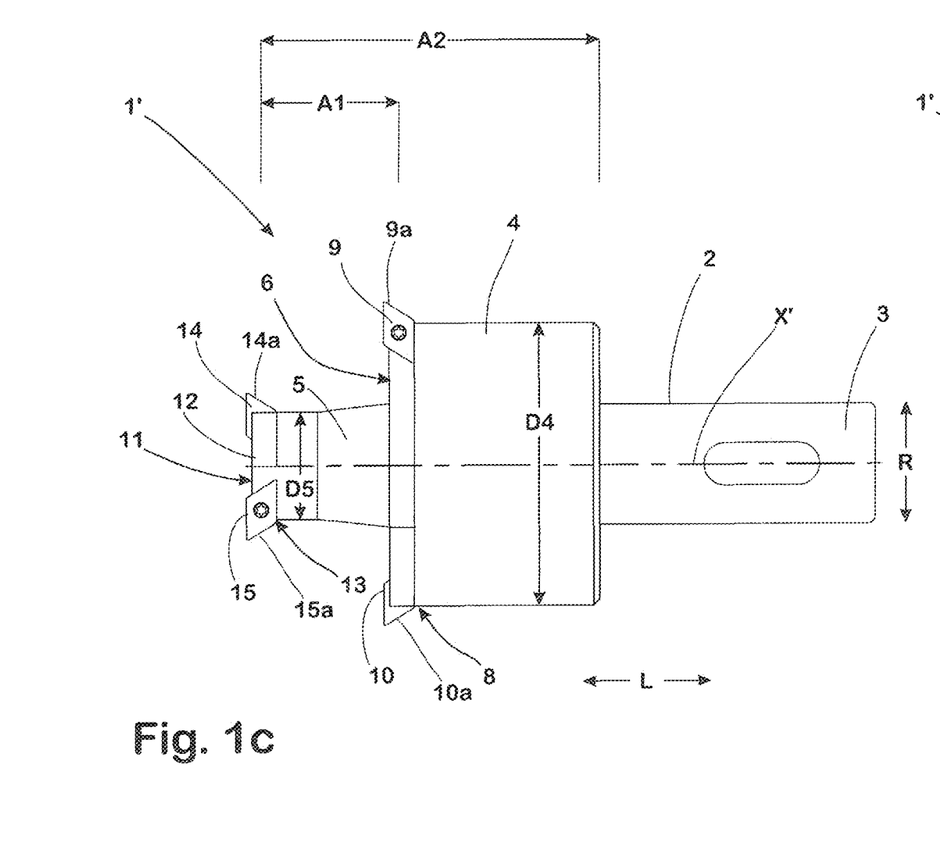
FIG. 1c a second tool for chamfering the end faces of teeth of an internally and externally toothed gearwheel.
Figure 1D:
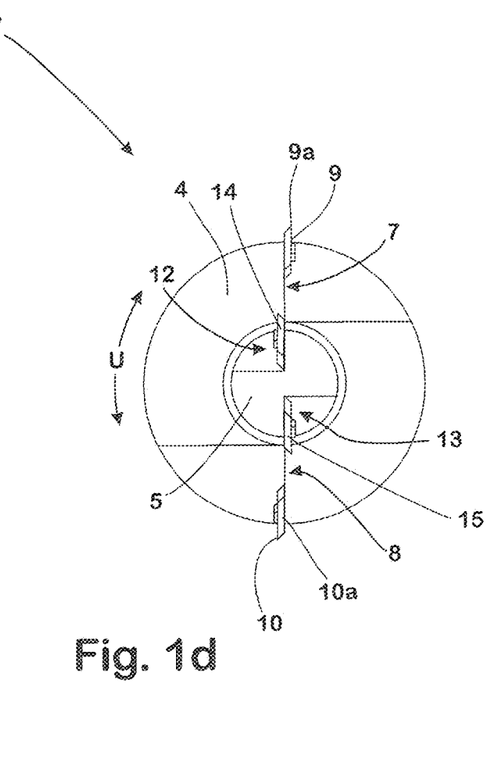
FIG. 1d the tool according to FIG. 1c in a frontal view towards its end face.

The tools 1', 1" shown in FIGS. 1a-c respectively comprise a tool carrier 2 made of a solid steel material by material-removing machining, which in its longitudinal direction L axially parallel to the axis of rotation X', X" of the respective tool 1', 1" is divided into three sections aligned coaxial to the axis of rotation X', X", namely a holding section 3, a middle section 4 and an end section 5.

The holding section 3 is designed in the manner of a cylindrical pin so that it is inserted into a correspondingly shaped, receptacle (not shown here) of a tool support and is held there in a conventional manner.

The middle section 4, designed as a cylindrical disc-shaped ledge, connects onto the holding section 3. Two seats 7, 8, adjacent to end face 6 of the middle section 4, said end face 6 being remote from the holding section 3, are formed for a respective chamfering tool 9, 10 in its peripheral surface. The chamfering tools 9, 10 are positioned so that their radially outwardly directed cutting edges 9a, 10a are arranged in a radial direction R relative to the respective axis of rotation X', X" of the tools 1', 1" opposite each other and point-symmetrical with respect to the respective axis of rotation X', X" (FIG. 1b). The receptacles 7, 8 and the chamfering tools 9, 10 of the tool 1' are arranged mirror-symmetrically to the receptacles 12, 13 and the chamfering tools 9, 10 of the tool 1" with respect to the axis of rotation X', X", so that, seen in the circumferential direction U, the cutting edges 9a, 10a of the chamfering tools 9, 10 of the tool 1' are aligned opposite to the cutting edges 9a, 10a of the chamfering tools 9, 10 of the tool 1".

The end section 5 with a cylindrical basic form abuts with its end facing the holding section 3 against the end face 6 of the middle section 4. The diameter D4 of the middle section 4 is approximately 2.3 times larger than the diameter D5 of the end section 5.

As in the middle section 4, two seats 12, 13 are formed in the peripheral surface of the end section 5, adjacent to the end face 11 of the end section 5, said end face 11 being remote from the holding section 3, for a respective chamfering tool 14, 15. The chamfering tools 14, 15 are likewise positioned in such a way that their radially outwardly directed cutting edges 14a, 15a are arranged opposite one another in the radial direction R relative to the axis of rotation X', X" of the tool 1. Here, too, the receptacles 12, 13 and the chamfering tools 14, 15 of the tool 1' are arranged mirror-symmetrically to the receptacles 12, 13 and to the chamfering tools 14, 15 of the tool 1" with respect to the axes of rotation X', X", so that, seen in the circumferential direction U, the cutting edges 14a, 15a of the chamfering tools 14, 15 of the tool 1' are aligned opposite to the cutting edges 14a, 15a of the chamfering tools 14, 15 of the tool 1".

Corresponding to the ratio of the diameters D4, D5 of the middle section 4 and the end section 5, the cutting edges 9a, 10a of the chamfering tools 9, 10 seated on the middle section 4 rotate on an impact circle S9, 10 whose radius R9, 10 is 2.3 times larger than the radius R14, 15 of the impact circle S14, 15.

At the same time, the distance A1, measured axially parallel to the axis of rotation X', X", between, on the one hand, the cutting edges 9a, 10a of the chamfering tools 9, 10 held on the end section 5 and, on the other hand, the cutting edges 14a, 15a of the chamfering tools 14, 15 held on the middle section 4 is about 40% of that distance A2, also measured axially parallel to the axis of rotation, between the end of the holding section 3 associated with the middle section 4 and the end face 11 of the end section 5 of the tool carrier 2 remote from the holding section 3.

The chamfering tools 9, 10, 14, 15 are conventional cutting plates which are commercially available for this purpose and are fastened, likewise in a known manner, to the respectively associated seat 7, 8, 12, 13 on the middle section 4 and the end section 5.

For chamfering the end faces 20 of the teeth 21 of the internal toothing 22 and the end faces 23 of the teeth 24 of the external toothing 25 of an internally and externally toothed annular gearwheel 26, two tools 1', 1" are used in a machine tool (not shown further here), which is prepared in a conventional manner for these purposes.

The axes of rotation X', X" of the two tools 1', 1" are aligned so that they meet at an acute angle when projected into a horizontal plane extending beyond the end sections 5 of the tools 1', 1".

At the same time, the tools 1', 1" are aligned with respect to the end face 27 of the gearwheel 26 facing towards them, so that their holding sections 3 are respectively opposite to the end face 27 and facing away from the end face 27 in an upward direction. In this case, one tool 1' is associated with the third quadrant V3 and the other tool 1" with the fourth quadrant V4 of the circle bounded by the gearwheel 26.

Figure 2A:
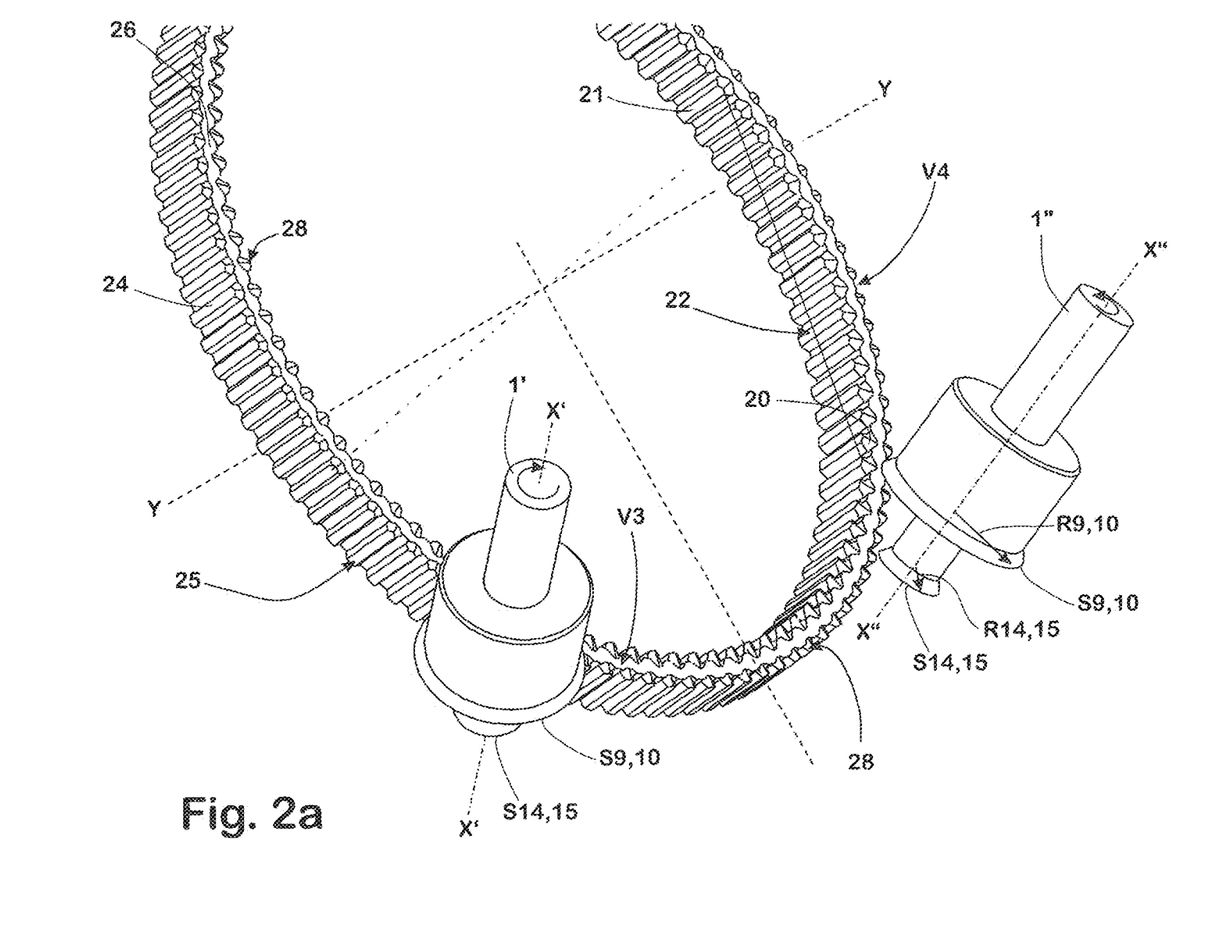
FIG. 2a a tool according to FIGS. 1a and 1b and designed according to FIG. 1c during the chamfering of the end faces of teeth of the external toothing of a gearwheel in a perspective, simplified view.
Figure 3A:
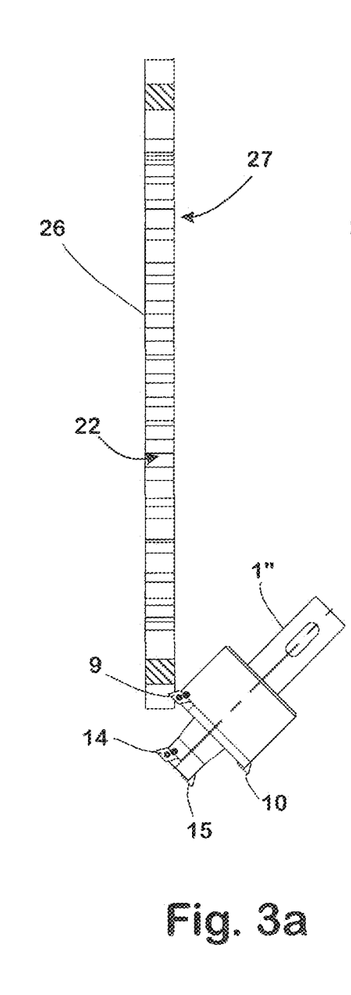
FIG. 3a a tool according to FIG. 2a during the chamfering of the end faces of teeth of the external toothing of a gearwheel in a lateral, partially longitudinally sectioned view.

For chamfering the end faces 23 of the teeth 24 of the external toothing 25, the tools 1', 1" are moved onto the gearwheel 26 in such a way that, with each rotation about their axis of rotation X', X", the chamfering tools 14, 15, seated respectively on their middle section 4, dip into the material of the respectively machined tooth 24 with their cutting edges 14a, 15a. In this case, the end section 5 of the tools 1', 1", with the chamfering tools 14, 15 attached to it, is free in the space present at the side or underneath the gearwheel 26 (FIG. 2a, 3a).

The chamfering of the end faces 23 takes place in a known manner in a continuous sequence with continuously counter-rotating tools 1', 1" and a gearwheel 26 rotating equally continuously about its axis of rotation Y, wherein the rotational movements of the tools 1', 1" and the gearwheel 26 and all other relative movements between the tools 1', 1" and the gearwheel 26, which may be required for a proper production of the chamfers 28, are synchronised in a known manner known by a controller not shown here.

After a sufficient number of revolutions of the gearwheel 26, the roof ridge-shaped chamfers 28 on the end faces 23 of the teeth 24 are finished.

Figure 2B:
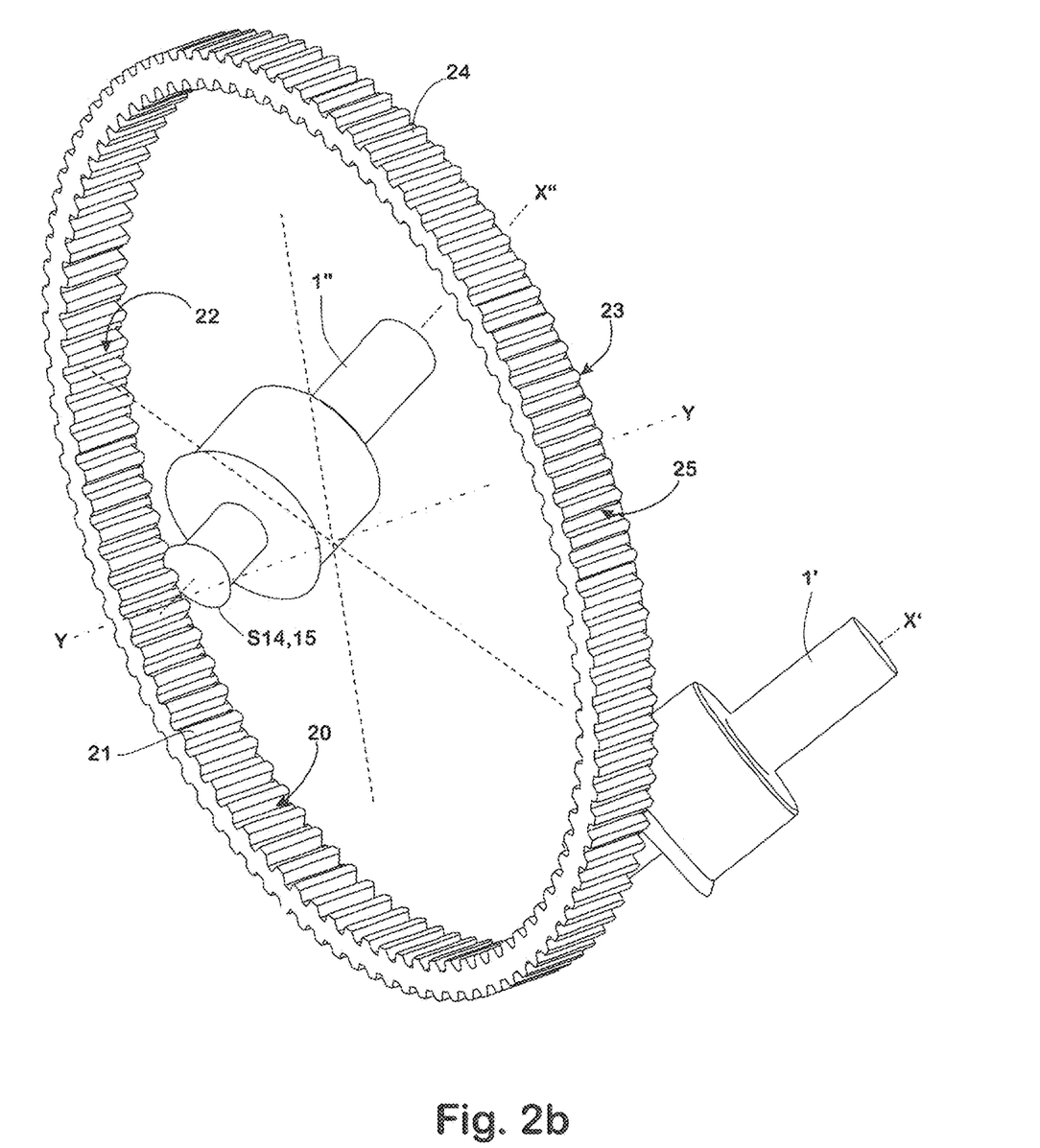
FIG. 2b the tools according to FIG. 2a during the chamfering of the end faces of teeth of the internal toothing of a gearwheel in a perspective, simplified view.
Figure 3B:
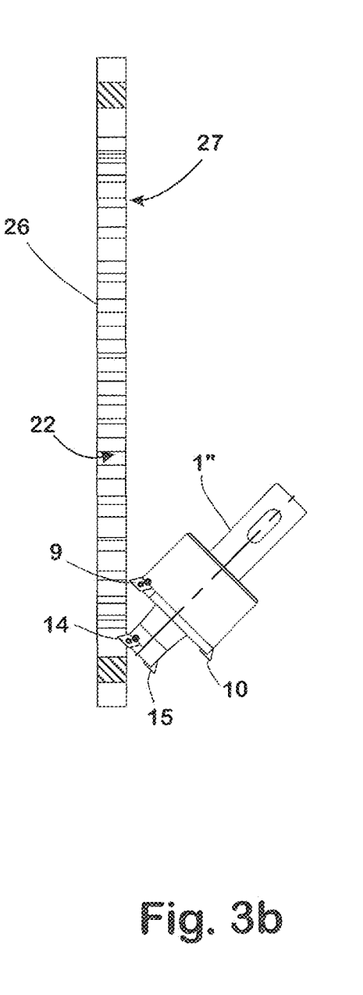
FIG. 3b the tool according to FIG. 2b during the chamfering of the end faces of teeth of the internal toothing of a gearwheel in a lateral, partially longitudinally sectioned view.

The tools 1', 1" are again positioned in the region of the quadrants V3, V4 in such a manner that, having the cutting edges 14a, 15a of the chamfering tools 14, 15 seated on their end sections 5, they come into chip-removing engagement with the end faces 20 of the teeth 21 of the internal toothing 22 (FIG. 2b, 3b). The middle sections 4 of the tools 1', 1", along with the chamfering tools 9, 10 carried by them, stand in free space in front of the end face 27 of the gearwheel 26, so that a collision of the chamfering tools 9, 10 with the gearwheel 26 during the chamfering machining of the teeth 21 of the internal toothing 22 is reliably precluded.

The chamfering machining of the teeth 21 of the internal toothing 22 is then carried out in accordance with the procedure for the chamfering machining of the teeth 24 of the external toothing 25, which has already been described and is known from the prior art.

Figure 4A:
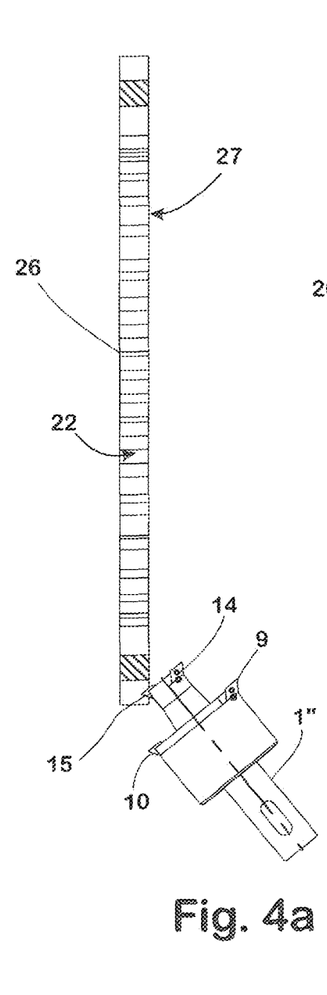
FIG. 4a a tool according to FIG. 2a in an alternative arrangement to the FIGS. 2a, 3a during the chamfering of the end faces of teeth of the external toothing of a gearwheel in a lateral, partially longitudinally sectioned view.
Figure 4B:
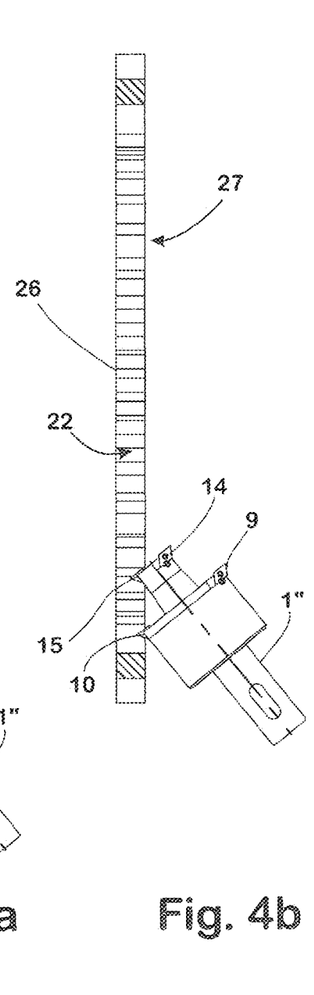
FIG. 4b the tool according to FIG. 4a during the chamfering of the end faces of teeth of the internal toothing of a gearwheel in a lateral, partially longitudinally sectioned view.

FIGS. 4a, 4b show an alternative possibility of using inventively designed tools 1, 1". In contrast to the examples shown in FIGS. 2a-3b, here the tools 1', 1" are aligned in such a way that their holding sections 3 point downward from the end face 27 of the gearwheel 26. In this arrangement, the chamfering machining of the end faces 23 of the teeth 24 of the external toothing 25 takes place with the chamfering tools 14, 15 arranged on the end section 5 of the tools 1', 1", whereas, after a corresponding adjustment of the tools 1', 1", the machining of the end faces 20 of the teeth 21 of the internal toothing 22 takes place by chamfering tools 9, 10 held on the middle section 4 of the tools 1', 1".

Regardless of which of the two orientations of the tools 1', 1" is selected, it is thus possible in an inventive design of the tools 1', 1" to finish the teeth 21, 24 of the internal and external toothing 22, 25 of the gearwheel 26 in a very short time, with minimal adjustment paths and thereby with minimal time required for the adjustment of the tools 1', 1", even if the gearwheel 26 has a large diameter.

REFERENCE NUMERALS

1', 1" Tool for chamfering the end faces 20, 23 of the teeth 21, 24 of the internal and externally toothed gearwheel 26
2 Tool carrier of the tools 1', 1"
3 Holding section of the tools 1', 1"
4 Middle section of the tools 1', 1"
5 End section of the tools 1', 1"
6 End face of the middle section 4
7, 8 Seats for a respective chamfering tool 9, 10
9, 10 Chamfering tools
9a, 10a Cutting edges of the chamfering tools 9, 10
11 End face of the end section 5

12, 13 Seats for chamfering tool 14, 15 respectively
14, 15 Chamfering tools
14a, 15a Cutting edges of the chamfering tools 14, 15
20 End faces of the teeth 21
21 Teeth of the internal toothing 22
22 Internal toothing of the gearwheel 26
23 End faces of the teeth 24
24 Teeth of the external toothing 25
25 External toothing of the gearwheel 26
26 Internally and externally toothed gearwheel
27 End face of the gearwheel 26
28 Roof ridge-shaped chamfers
A1 Distance between the cutting edges 9a, 10a of the chamfering tools 9, 10 held on the end section 5 on the one hand and the cutting edges 14a, 15a of the chamfering tools 14a, 15 held on the middle section 4 on the other hand
A2 Distance between the end of the holding section 3 associated with the middle section 4 and the end face 11 of the end section 5 of the tool carrier 2 remote from the holding section 3
D4 Diameter of the middle section 4
D5 Diameter of the end section 5
L Longitudinal direction of the tools 1', 1"
R Radial direction
R9, 10 Radius of the impact circle S9, 10
R14, 15 Radius of the impact circle S14, 15
S9, 10 Impact circle of the chamfering tools 9, 10
S14, 15 Impact circle of the chamfering tools 14, 15
U Circumferential direction
V3, V4, Quarter circles (quadrants) of the circle circumscribed by the gearwheel 26
X', X" Axes of rotation of the tools 1', 1"
Y Axis of rotation of the gearwheel 26

The invention claimed is:

1. A tool for producing roof ridge-shaped chamfers on teeth of an internally and externally toothed gearwheel, wherein the tool comprises
a finger-like tool carrier having a holding section which is associated with an end face of the tool carrier and provided for fastening in a tool holder of a machine tool, and
a chamfering tool, which is held on the end section of the tool carrier associated with the other end face, and during use describes an impact circle with its cutting edge, whose diameter is determined by the radial distance of the cutting edge of the chamfering tool from the axis of rotation of the tool,
wherein at least one further chamfering tool is attached in a middle section of the tool carrier, which is offset in the direction of the holding section of the tool carrier relative to the end section provided with the chamfering tool, and
wherein the further chamfering tool is held with its cutting edge at a radial distance to the axis of rotation of the tool, said radial distance being greater than the radial distance of the cutting edge of the chamfering tool held on the end section of the tool holder,
characterised in that the radial distance of the cutting edge of the chamfering tool, attached respectively to the middle section of the tool carrier, from the axis of rotation is at least 1.5 times greater than the radial distance of the cutting edge of the chamfering tool, attached respectively to the end section of the tool carrier, from the axis of rotation.

2. The tool according to claim 1, characterised in that the middle section is designed as a ledge, on which a seat for the further chamfering tool is provided.

3. The tool according to claim 1, characterised in that the distance, measured axially parallel to the axis of rotation, between the cutting edge of the chamfering tool held on the end section and the cutting edge of the chamfering tool held on the middle section is at least 30% of the distance, also measured axially parallel to the axis of rotation, between the end of the holding section associated with the middle section and the end face of the end section of the tool carrier remote from the holding section.

4. The tool according to claim 1, characterised in that at least two chamfering tools are fixed to the end section of the tool carrier.

5. The tool according to claim 1, characterised in that at least two chamfering tools are fixed to the middle section.

6. The tool according to claim 3, characterised in that the chamfering tools associated with the middle section or the end section are arranged opposite one another in the radial direction with respect to the axis of rotation of the tool.

7. The tool according to claim 1, characterised in that the chamfering tools are cutting plates.

8. A machine for producing roof ridge-shaped chamfers on the teeth of an internally and externally toothed gearwheel, wherein the machine comprises a drive, which drives the gearwheel to be machined during use so that it rotates about its axis of rotation, two tools designed according to claim 1, at least one drive, which drives the tools during use so that they rotate about their respective axis of rotation, and control devices, which are provided for adjusting the tools between a first working position, in which, having their chamfering tools seated on their end sections, they engage with the end faces of one of the teeth of the gearwheel, and a second working position, in which, having their chamfering tools seated on their middle sections, they engage with the end surfaces of the other teeth of the gearwheel.

9. A method for producing roof ridge-shaped chamfers on the end faces of the teeth of an internal and external toothing of an internally and externally toothed gearwheel, wherein the method comprising the following steps:
clamping two tools for producing roof ridge-shaped chamfers on teeth of an internally and externally toothed gearwheel respectively in a tool receptacle, wherein the tools comprise a finger-like tool carrier having a holding section, which is associated with an end face of the tool carrier and provided for fastening in a tool holder of a machine tool, and a chamfering tool chamfering tool, which is held on the end section of the tool carrier, said end section being associated with the other end face, and during use describes an impact circle with its cutting edge, the diameter of said circle being determined by the radial distance of the cutting edge of the chamfering tool from the axis of rotation of the tool, and wherein at least one further chamfering tool is attached in a middle section of the tool carrier which is offset relative to the end section provided with the chamfering tool towards the holding section of the tool carrier, said chamfering tool being held with its cutting edge at a radial distance to the axis of rotation of the tool, said radial distance being greater than the radial distance of the cutting edge of the chamfering tool held on the end section of the tool holder;
adjusting the tools into a respective first working position, in which, having their chamfering tools seated on their end sections, they engage with the end faces of one of the teeth of the gearwheel, and
adjusting the tools remaining in their tool holder into a respective second working position, in which, having their chamfering tools seated on their middle sections, they engage with the end faces of the other teeth of the gearwheel.

10. The method according to claim 9, characterised in that the tools and their axes of rotation are positioned and aligned with respect to the gearwheel to be machined, such that when the tools are in their first working position, having their chamfering tools seated on their end sections, they engage with the end faces of the teeth of the internal toothing of the gearwheel, and when they are in their second working position, having their chamfering tools seated on their middle sections, they engage with the end faces of the teeth of the external toothing.

11. The method according to claim 9, characterised in that the tools and their axes of rotation are positioned and aligned with respect to the gearwheel to be machined such that, when the tools are in their first working position, having their chamfering tools seated on their end sections, they engage with the end faces of the teeth of the external toothing of the gearwheel and when they are in their second working position, having their chamfering tools seated on their middle sections, they engage with the end faces of the teeth of the internal toothing.

12. The method according to claim 9, characterised in that when the tools are in their second working position they are associated with the same quadrant of the internal and external toothing of the gearwheel to be machined as in their first working position.

13. The method according to claim 9, characterised in that the tools are driven to rotate in opposite directions about their axis of rotation.

14. The method according to claim 13, characterised in that, during the machining of the end faces of the teeth of the internal toothing, the direction of rotation of the tools is respectively opposite to the direction of rotation with which they rotate during the machining of the end faces of the teeth of the external toothing.

* * * * *